US008586900B2

(12) United States Patent
Kim et al.

(10) Patent No.: US 8,586,900 B2
(45) Date of Patent: Nov. 19, 2013

(54) COOKING APPARATUS HAVING COOLING FLOW PATH

(75) Inventors: Su-hwan Kim, Changwon-shi (KR); Wan-soo Kim, Gwangmyong-shi (KR)

(73) Assignee: LG Electronics Inc., Seoul (KR)

( * ) Notice: Subject to any disclaimer, the term of this patent is extended or adjusted under 35 U.S.C. 154(b) by 828 days.

(21) Appl. No.: 11/848,608

(22) Filed: Aug. 31, 2007

(65) Prior Publication Data

US 2008/0149632 A1 Jun. 26, 2008

(30) Foreign Application Priority Data

Sep. 1, 2006 (KR) ........................ 10-2006-0084335
Sep. 12, 2006 (KR) ........................ 10-2006-0088288
Sep. 12, 2006 (KR) ........................ 10-2006-0088289
Sep. 12, 2006 (KR) ........................ 10-2006-0088293
Sep. 12, 2006 (KR) ........................ 10-2006-0088294
Sep. 12, 2006 (KR) ........................ 10-2006-0088295
Sep. 12, 2006 (KR) ........................ 10-2006-0088296

(51) Int. Cl.
*H05B 6/64* (2006.01)
*A47J 27/00* (2006.01)

(52) U.S. Cl.
USPC ......... 219/757; 126/21 A; 126/273 A; 99/339

(58) Field of Classification Search
USPC .............. 219/757, 681, 400; 126/21 A, 21 R, 126/299 R, 299 D
See application file for complete search history.

(56) References Cited

U.S. PATENT DOCUMENTS 3,088,453 A 5/1963 Grahn et al.
3,576,417 A 4/1971 Tingley
3,654,417 A 4/1972 Javes et al.
3,882,843 A * 5/1975 Barnett ..................... 126/273 A
3,911,893 A 10/1975 Baker et al.
3,973,551 A * 8/1976 Caselani et al. ............ 126/21 A
4,096,369 A 6/1978 Tanaka et al.

(Continued)

FOREIGN PATENT DOCUMENTS

CN 1142037 2/1997
CN 1309266 8/2001

(Continued)

OTHER PUBLICATIONS

International Search Report dated Jun. 13, 2007.

(Continued)

*Primary Examiner* — Quang Van
(74) *Attorney, Agent, or Firm* — KED & Associates, LLP

(57) ABSTRACT

A cooking apparatus is provided. The cooking apparatus includes a cooking cavity, an upper space formed above the cooking cavity, lateral side spaces formed to at opposite lateral sides of the cooling cavity, a rear space formed behind the cooking cavity, and a lower space formed below the cooking cavity. A fan provided in the rear space generates a cooling flow that cools components housed in the rear space. A cooling flow path extends from the rear space and into the upper space and lateral side spaces. Flow from the upper space enters the door to cool the door and is exhausted through a lower portion of the door. Flow from the lateral side spaces, which includes an exhaust flow from the cooking cavity, is guided to the lower space and exhausted. In this manner, the cooking apparatus can be completely cooled and cooking odors and heat appropriately exhausted by the cooling fan positioned in the rear space.

20 Claims, 9 Drawing Sheets

(56) References Cited

U.S. PATENT DOCUMENTS

| | | | | |
|---|---|---|---|---|
| 4,132,878 | A | 1/1979 | Tachikawa et al. | |
| 4,184,945 | A | 1/1980 | Morgan et al. | |
| 4,255,640 | A | 3/1981 | Bressler | |
| 4,327,274 | A | 4/1982 | White et al. | |
| 4,559,428 | A | 12/1985 | Takeuji | |
| 4,591,683 | A | 5/1986 | Eke | |
| 4,598,689 | A | 7/1986 | Eke | |
| 5,204,503 | A | 4/1993 | Maiellano et al. | |
| 5,525,782 | A | 6/1996 | Yoneno et al. | |
| 5,634,961 | A * | 6/1997 | Gordon | 95/17 |
| 5,674,425 | A | 10/1997 | Hong | |
| 5,814,793 | A | 9/1998 | Yu | |
| 5,818,015 | A | 10/1998 | Lee et al. | |
| 5,847,377 | A | 12/1998 | Yang et al. | |
| 5,994,683 | A | 11/1999 | Braunisch et al. | |
| 6,472,640 | B2 | 10/2002 | Brown et al. | |
| 6,621,058 | B1 * | 9/2003 | Kim | 219/757 |
| 6,864,472 | B2 | 3/2005 | Kang | |
| 6,984,811 | B2 | 1/2006 | Lee | |
| 6,987,252 | B2 | 1/2006 | Graves et al. | |
| 7,019,272 | B2 | 3/2006 | Braunisch et al. | |
| 2001/0009256 | A1 | 7/2001 | Nasu et al. | |
| 2002/0063126 | A1 | 5/2002 | Kim et al. | |
| 2003/0116415 | A1 | 6/2003 | Ardrey et al. | |
| 2003/0218011 | A1 | 11/2003 | Jeong | |
| 2004/0082367 | A1 | 4/2004 | Nakanishi | |
| 2005/0023277 | A1 | 2/2005 | Kim et al. | |
| 2005/0223912 | A1 | 10/2005 | Kim et al. | |
| 2006/0157481 | A1 * | 7/2006 | Oh et al. | 219/757 |
| 2006/0278216 | A1 | 12/2006 | Gagas et al. | |

FOREIGN PATENT DOCUMENTS

| | | | | |
|---|---|---|---|---|
| CN | 1528106 | | 9/2004 | |
| CN | 1697898 | | 11/2005 | |
| CN | 1752532 | A | 3/2006 | |
| CN | 1769801 | | 5/2006 | |
| DE | 38 39 657 | | 5/1990 | |
| EP | 0 248 580 | | 12/1987 | |
| EP | 0 653 900 | | 5/1995 | |
| EP | 0 768 809 | | 4/1997 | |
| EP | 1 081 436 | | 3/2001 | |
| EP | 1 120 606 | | 8/2001 | |
| EP | 1 215 943 | | 6/2002 | |
| EP | 1 439 740 | | 7/2004 | |
| EP | 1 580 488 | | 9/2005 | |
| EP | 1 615 471 | | 1/2006 | |
| EP | 1 640 666 | | 3/2006 | |
| EP | 1 640 667 | | 3/2006 | |
| EP | 1 640 668 | | 3/2006 | |
| EP | 1 698 832 | | 9/2006 | |
| EP | 2 057 417 | | 5/2009 | |
| EP | 2 066 974 | | 6/2009 | |
| FR | 2 609 159 | | 7/1988 | |
| FR | 2 655 132 | | 5/1991 | |
| FR | 2 773 209 | | 7/1999 | |
| GB | 1 165 535 | | 10/1969 | |
| GB | 2 237 487 | | 5/1991 | |
| JP | 58-000023 | | 1/1983 | |
| JP | 58-213122 | | 12/1983 | |
| JP | 58-214722 | | 12/1983 | |
| JP | 59-044530 | | 3/1984 | |
| JP | 59-060128 | | 4/1984 | |
| JP | 59-071928 | | 4/1984 | |
| JP | 60-042515 | | 3/1985 | |
| JP | 60-042516 | | 3/1985 | |
| JP | 60-223918 | | 11/1985 | |
| JP | 61-165525 | | 7/1986 | |
| JP | 63-201427 | | 8/1988 | |
| JP | 64-12106 | | 1/1989 | |
| JP | 64-012106 | | 1/1989 | |
| JP | 01-189422 | | 7/1989 | |
| JP | 2-161215 | | 6/1990 | |
| JP | 03-011233 | | 1/1991 | |
| JP | 3-11233 | * | 1/1991 | 219/759 |
| JP | 04-093521 | | 3/1992 | |
| JP | 05-113226 | | 5/1993 | |
| JP | 07-119973 | | 5/1995 | |
| JP | 7-119973 | | 5/1995 | |
| JP | 08-035668 | | 2/1996 | |
| JP | 8-152140 | * | 6/1996 | |
| JP | 9-230805 | | 9/1997 | |
| JP | 11-034763 | | 2/1999 | |
| JP | 11-108360 | | 4/1999 | |
| JP | 2000-161682 | | 6/2000 | |
| JP | 2000-257876 | | 9/2000 | |
| JP | 2001-208356 | | 8/2001 | |
| JP | 2002-048346 | | 2/2005 | |
| JP | 2006-207874 | | 8/2006 | |
| KR | 1995-0003729 | | 2/1995 | |
| KR | 1995-013440 | | 6/1995 | |
| KR | 10-1997-0021987 | | 5/1997 | |
| KR | 20-0139670 | | 3/1998 | |
| KR | 1998-0010065 | | 4/1998 | |
| KR | 10-1998-0057927 | | 9/1998 | |
| KR | 1998-053939 | | 9/1998 | |
| KR | 1999-0030655 | | 7/1999 | |
| KR | 1999-0055521 | | 7/1999 | |
| KR | 20-0174144 | | 12/1999 | |
| KR | 100254605 | | 2/2000 | |
| KR | 1020010018754 | | 3/2001 | |
| KR | 10-2001-0068546 | | 7/2001 | |
| KR | 2001-0064859 | | 7/2001 | |
| KR | 1020010060667 | | 7/2001 | |
| KR | 10-2002-0007033 | | 1/2002 | |
| KR | 10-2002-0050026 | | 6/2002 | |
| KR | 2003-0092149 | | 12/2003 | |
| KR | 1020040019624 | | 3/2004 | |
| KR | 10-2004-0108050 | | 12/2004 | |
| KR | 10-2005-0010565 | | 1/2005 | |
| KR | 10-2005-0035776 | | 4/2005 | |
| KR | 10-2006-0062198 | | 6/2006 | |
| KR | 10-2006-0075154 | | 7/2006 | |
| RU | 2 175 467 | | 10/2001 | |
| RU | 2 258 328 | | 8/2005 | |
| WO | WO 03/077601 | | 9/2003 | |
| WO | WO2008/0026799 | | 3/2008 | |

OTHER PUBLICATIONS

International Written Opinion dated Mar. 17, 2009.
International Search Report dated May 23, 2007.
European Search Report dated Jul. 21, 2009.
Supplementary European Search Report dated Jul. 24, 2009.
U.S. Office Action dated Nov. 2, 2009.
U.S. Office Action dated Oct. 23, 2009.
U.S. Office Action dated Oct. 28, 2009.
Mexican office Action issued in MX Application No. MX/A/2009/002263 dated Sep. 26, 2011.
Russian Office Action issued in RU Application No. 2010130154 dated Oct. 27, 2011.
U.S. Office Action issued in U.S. Appl. No. 11/848,551 dated Dec. 21, 2010.
U.S. Office Action issued in U.S. Appl. No. 11/848,583 dated Nov. 5, 2010.
U.S. Office Action issued in U.S. Appl. No. 12/869,285 dated Jan. 9, 2012.
Office Action issued in MX Patent Application No. MX/A/2009/002676 received Nov. 23, 2011.
Office Action issued in MX Patent Application No. MX/A/2009/002674 received Nov. 23, 2011.
European Communication issued in EP Application No. 06823996.1 dated Jun. 25, 2010.
European Search Report issued in EP Application No. 10007344.4 dated Sep. 1, 2010.
U.S. Office Action issued in U.S. Appl. No. 11/848,620 dated Mar. 25, 2010.
European Extended Search Report issued in EP patent application No. 06823998.7 dated Mar. 3, 2010.
European Extended Search Report issued in EP patent application No. 06823992.0 dated Feb. 5, 2010.

(56) References Cited

OTHER PUBLICATIONS

European Extended Search Report issued in EP patent application No. 06823995.3 dated Feb. 24, 2010.
European Extended Search Report issued in EP patent application No. 06823996.1 dated Mar. 5, 2010.
Chinese Office Action issued in CN Patent Application No. 2006800558204 dated Jan. 22, 2010.
European Extended Search Report issued in EP patent application No. 06823999.5 dated Feb. 11, 2010.
U.S. Office Action issued in U.S. Appl. No. 12/869,255 dated Feb. 22, 2012.
European Search Report issued in EP Application No. 06823999.5 dated Nov. 30, 2010.
Chinese Office Action issued in Chinese Patent Application No. 200680055735.8 dated Mar. 2, 2010.
Chinese Office Action issued in Chinese Patent Application No. 200680055819.1 dated Dec. 18, 2009.
Chinese Office Action issued in Chinese Patent Application No. 200680055809.8 dated Apr. 27, 2010.
Russian Office Action issued in Russian Application No. 2009113560 dated Mar. 18, 2010.
European Search Report issued in European Patent Application No. 06823997.9 dated Apr. 20, 2010.
Chinese Office Action issued in Chinese Patent Application No. 200680055818.7 dated May 25, 2010.
Chinese Office Action issued in Chinese Patent Application No. 200680055814.9 dated May 11, 2010.
Chinese Office Action issued in CN Application No. 201010228906.0 dated Apr. 19, 2011 (full Chinese text and full English translation).
U.S. Office Action issued in U.S. Appl. No. 11/848,541 dated Jun. 14, 2011.
Russian Office Action issued in Russian Patent Application No. 2009111886 dated Apr. 30, 2010.
Russian Office Action issued in Russian Application No. 2009113564 dated Jun. 1, 2010.
Russian Office Action issued in Russian Application No. 2009113563 dated Jun. 9, 2010.
Russian Office Action issued in Russian Application No. 2009113630 dated Jul. 1, 2010.
Russian Office Action issued in Russian Application No. 2009113583 dated Jul. 6, 2010.
U.S. Office Action issued in U.S. Appl. No. 11/853,907 dated Aug. 15, 2011.
U.S. Office Action issued in U.S. Appl. No. 11/853,903 dated Aug. 22, 2011.
Russian Office Action issued in RU Application No. 2009113626 dated Jul. 29, 2010.

* cited by examiner

COOKING APPARATUS HAVING COOLING FLOW PATH

This application claims benefit under 35 U.S.C. §119 from Korean Patent Application Nos. 10-2006-0084335, filed on Sep. 1, 2006; 10-2006-0088289, filed Sep. 12, 2006; 10-2006-0088293, filed Sep. 12, 2006; 10-2006-0088288, filed Sep. 12, 2006; 10-2006-0088294, filed Sep. 12, 2006; 10-2006-0088295, filed Sep. 12, 2006; and 10-2006-0088296, filed Sep. 12, 2006, the entirety of which is incorporated herein by reference.

BACKGROUND

1. Field

This relates in general to a heating apparatus, and more specifically, to a cooking apparatus provided with a magnetron and a heater so as to cook food positioned in a cooking cavity thereof.

2. Background

In general, a cooking apparatus is an apparatus that cooks food by generating or transferring heat to food placed in a cooking cavity. Examples of such a cooling apparatus may include, for example, a microwave oven, a combined microwave oven and convection oven, a conventionally heated standard oven and the like.

A cooking apparatus typically includes a component room that houses a plurality of heating components. The component room is typically positioned to a side of a cooking cavity in which food is heated. A control panel is typically provided on a front of this component room, and to a side of a door that opens and closes the cooking cavity. This type of arrangement impacts the usable size, such as, for example, a height, width and depth, of the cooking cavity. This may also affect the arrangement of the heating components and the corresponding size of the component room housing the heating components. This type of arrangement also makes it difficult to provide for adequate cooling flow to the heating components and venting of heat and cooking odors from the cooking cavity.

BRIEF DESCRIPTION OF THE DRAWINGS

The embodiments will be described in detail with reference to the following drawings in which like reference numerals refer to like elements wherein.

DETAILED DESCRIPTION

Figure 1:
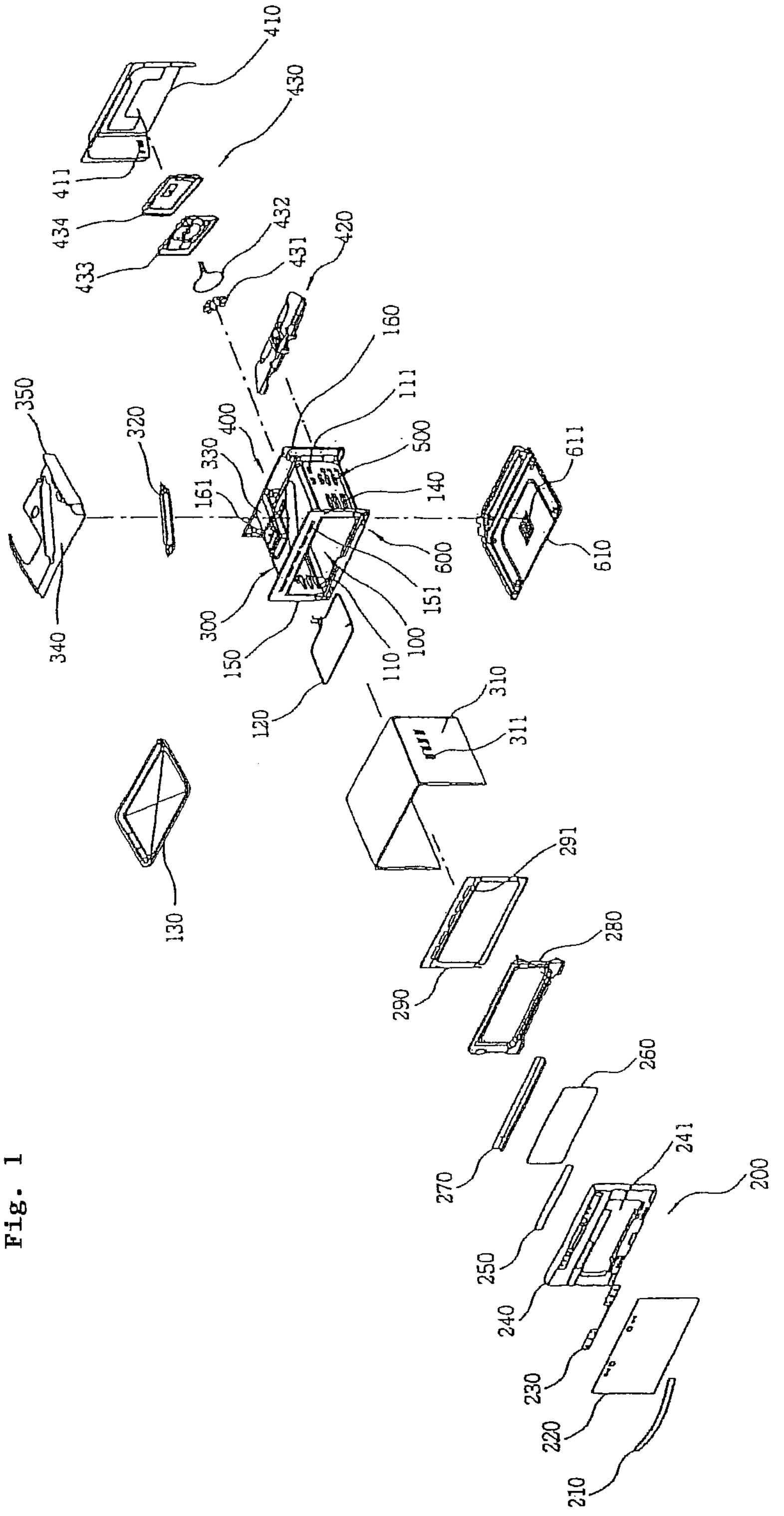
FIG. 1 is an exploded view of an exemplary cooking apparatus, in accordance with an embodiment as broadly described herein.

FIG. 1 is an exploded view of an exemplary cooking apparatus as embodied and broadly described herein. The exemplary cooling apparatus may include a cooking cavity 100, a door 200, an upper space 300 located over the cooking cavity 100, a rear space 400 located at the rear of the cooking cavity 100, lateral spaces 500 located on both sides of the cooking cavity 100, and a lower space 600 located under the cooking cavity 100.

The cooking cavity 100 is a space for cooking food, and may be defined by an inner case 110. A heater 120 may be provided at the upper portion and/or lower portion of the inside of the cooking cavity 100, and a plate or a rack 130 may be placed inside the cooking cavity 100. The inner case 110 may include an inlet (not shown) and an outlet 111 formed on the sides for forming an air flow path that directs heat and odors from inside the cooking cavity 100 to an outside of the cooking apparatus. The heater 120 may be, for example, a sheath heater, or other such heater as appropriate. The use of a plate 130 instead of a circular turn table within the cavity 100 alters the usable width and length (depth) of the cooking cavity 100. A size of an item placed in the cavity 100 would otherwise be restricted by a turn table and its movement within the cavity 100. However, a circular turn table may be used in appropriate circumstances.

A guide 140 that guides the plate 130 into the cooking cavity 100 may be provided at one side of the cooking cavity 100, and a front frame 150 and a rear frame 160 may be respectively provided at the front and the rear of the cooling cavity 100. The front frame 150 may have an opening 151 that defines a flow path between the upper space 300 and the door 200. The rear frame 160 may also have an opening 161 at its upper side to provide for communication between the upper space 300 and the rear space 400.

The door 200 may be hinged to the cooking cavity 100 so that the door 200 can open and close the cooking cavity 100. In certain embodiments, the door 200 may be hinged to the cooking cavity at corresponding lower portions thereof. Other positions for the hinge point may also be appropriate. The door 200 may extend across both the cooking cavity 100 and the upper space 300. The door 200 may include a handle 210, a front plate 220, an input sensor 230, a door panel 240, a control panel 250, a middle plate 260, a bracket 270, a door frame 280, and a choke cover 290.

The handle 210 may be used to open or close the door 200, and may be fixed to the front plate 220 by bolts or other suitable fastener (not shown). The handle 210 may have at least one channel (not shown) formed inside along its longitudinal direction such that the channel is in communication with the outside. This may reduce the total weight of the handle, and may minimize the amount of heat transferred to a user through the handle 210 from the cooking cavity 100 during cooking. Although a handle is shown, other devices or methods may be used to open or close the door.

The front plate 220 may be made of a transparent material, such as, for example, glass, such that the inside of the cooking cavity 100 is visible therethrough. A display (not shown) including, for example, buttons or other such suitable indicators/activators, may be attached thereto or coated thereon, the buttons providing for selection of a cooking course or for the indication of an operating status of the cooking apparatus or other functions or information of the cooking apparatus.

The input sensor 230 may be operably coupled to the buttons to recognize which button has been selected. If the input sensor 230 is positioned to the rear of the front plate 220, which is, for ease of discussion, made of glass, then the input sensor 230 may be, for example, a glass touch unit and serve as an electrostatic sensor. The input sensor 230 may be attached to the front plate 220 using tape or other suitable attachment mechanism. The input sensor 230 may be located at the upper portion of the door 200 facing the upper space 300 of the cooking cavity 100. This structure yields a broader cooking cavity 100 and an unobstructed view into the cooking cavity 100.

The door panel 240 receives other components such as, for example, the front plate 220, the control panel 250 and the like of the door 200, and has an opening 241 which allows the inside of the cooking cavity 100 to be viewed. Moreover, the door panel 240 may include in its lower side an outlet 242 (see FIG. 6). This outlet 242 allows cooling flow traveling along a cooling flow path extending from a cooling fan 420 to the door 200 via the upper space 300 to be discharged.

The control panel 250 may control the overall operation of the cooking apparatus based on an input received through the input sensor 230. To this end, the control panel 250 may cooperate with the input sensor 230 and a relay substrate 350 including a printed circuit board with related control circuitry, and may be fixed to the door panel 240 from the rear side of the input sensor 230. In certain embodiments, the control panel 250 may include a light-emitting source such as, for example an LED (light emitting diode) or an ELD (organic or inorganic electroluminescent device), and may irradiate the light emitted from the light-emitting source to a display (not shown).

A middle plate 260 may be fixed to the door panel 240, spaced apart from the front plate 220 and the door frame 280. The middle plate 260 may block heat transfer from the cooking cavity 100 to the front plate 220 and the handle 210. The middle plate 260 may be installed at the door panel 240 so that a flow generated from the cooling fan 420 enters the door 200 via the rear space 400 and the upper space 300 and then travels between the middle plate 260 and the front plate 220 under the guidance of the bracket 270. Such a flow vents through the outlet 242 in the door panel 240.

The bracket 270 may be fixed to the door panel 240 from the rear side of the control panel 250. In this position, the bracket 270 protects the input sensor 230 and the control panel 250, each including electronic components, against heat and microwaves from the cooking cavity 100, and against the impinging flow of the cooling fan 420, and guides the flow to travel between the door panel 240 and the front plate 220. The door frame 280 may be accommodated in the door panel 240 to block leakage of microwaves to outside of the cooking apparatus.

The choke cover 290 forms a cover for the door 200 on the side of the door 200 facing the cooking cavity 100. The choke cover 290 has an opening 291 that corresponds to the opening 151 in the front frame 150. The opening 291 may be formed on the upper side of the choke cover 290. Other locations may also be appropriate, depending, for example, on the location of the opening 151 and other openings aligned therewith. In certain embodiments, the opening 291 includes a number of holes sized so as to allow cooling air to flow therethrough, while preventing food or foreign substances from getting into the door 200 while the door 200 is being opened.

The upper space 300 is a space over the cooking cavity 100 defined by an upper surface of the cooking cavity 100 and an external case 310. The upper space 300 may house a variety of components, such as, for example, a heater 320, a waveguide 330, an insulating upper plate 340, and the relay substrate 350. A lamp (not shown) for illuminating the cooking cavity 100 may also be housed in the upper space 300.

The external case 310 may have a shape that encompasses the top and both sides of the cooking cavity 100, leaving a certain space or distance therebetween, and may be connected to the front frame 150 and the rear frame 160. If necessary, the external case 310 may have an outlet 311 so that a flow having traveled around the cooking cavity 100 and the heating elements installed in the cooking apparatus can be vented to the outside.

The heater 320 may be, for example, a halogen heater or other types. Since such a heater 320 is influenced by microwaves, unlike the heater 120 which may be in the form of a sheath heater, as previously discussed, the heater 320 may be installed at the upper side of the inner case 110 so as to provide heat downwardly into the cooking cavity 100 from above.

The waveguide 330 may extend from the rear space 400 to the upper space 300, and may provide microwaves generated from a magnetron 440 to the cooking cavity 100. To do this, a port 331 (see FIG. 2) may be provided at the upper surface of the cooking cavity 100.

The insulating upper plate 340 prevents heat generated by the heater 120 housed in the inner case 110 from transferring to the upper space 300. In certain embodiments, the insulating upper plate 340 has a shape that covers the upper portion of the cooking cavity 100 except for the heater 320 and the waveguide 330.

The relay substrate 350 may be mounted on the insulating upper plate 340 at one side of the upper space 300. The relay substrate 350 works with the control panel 250 to operate various components, including the magnetron 440 provided in the rear space 400.

Figure 2:
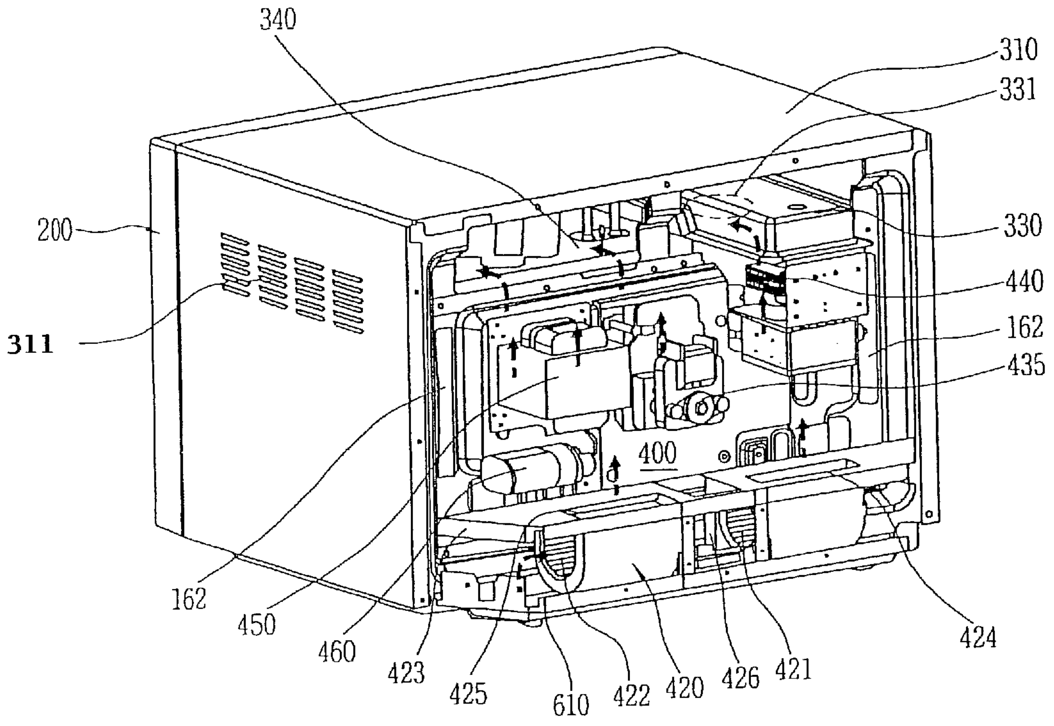
FIGS. 2 and 3 are schematic views of a rear space of the exemplary cooking apparatus shown in FIG. 1, in accordance with embodiments as broadly described herein.

FIG. 2 is a view of an exemplary rear space of a cooking apparatus in accordance with embodiments as broadly described herein. The rear space 400 is a space behind the cooking cavity 100 defined by a rear surface of the cooking cavity 100, the rear frame 160, and a cover 410. The rear space 400 may house various components, such as, for example, a cooling fan 420, a convection heater assembly 430, and heating elements such as, for example, a magnetron 440, a high voltage transformer 450, and a high voltage capacitor 460, thus building a component room of the cooking apparatus.

The cover 410 may be connected to the rear frame 160 or the outer case 310 so as to cover the upper space 300 and the rear space 400, and its lower portion may be connected to a base 610. An inlet 411 may be provided, for example, at the lower portion of the cover 410 or the base 610 to allow for air inflow into the cooling fan 420.

The cooling fan 420 may be located at the lower portion of the rear space 400. In certain embodiments, the cooling fan 420 may be oriented, for example, along a width direction of the rear space 400. However, other positions and orientations may also be appropriate based on the placement of various other components in the rear space 400. The cooling fan 420 may include flow-generators 421 and 422 on both sides to cool the components installed above the cooling fan 420. As the rear space 400, the upper space 300 and the door 200 are built so as to maintain communication therebetween, the entire area of the cooking apparatus can be cooled by the cooling fan 420. The cooling fan 420 may also include a partition wall 423 for preventing the flow generated by the cooling fan 420 from flowing back to the cooling fan 420. The partition wall 423 may have openings 424 and 425 provided, for example, on both sides so as to direct the flow up towards the upper portion of the rear space 400. A motor (not shown) for driving the flow-generators 421 and 422 may be provided in a space 426 between the flow generators 421 and 422.

Figure 3:
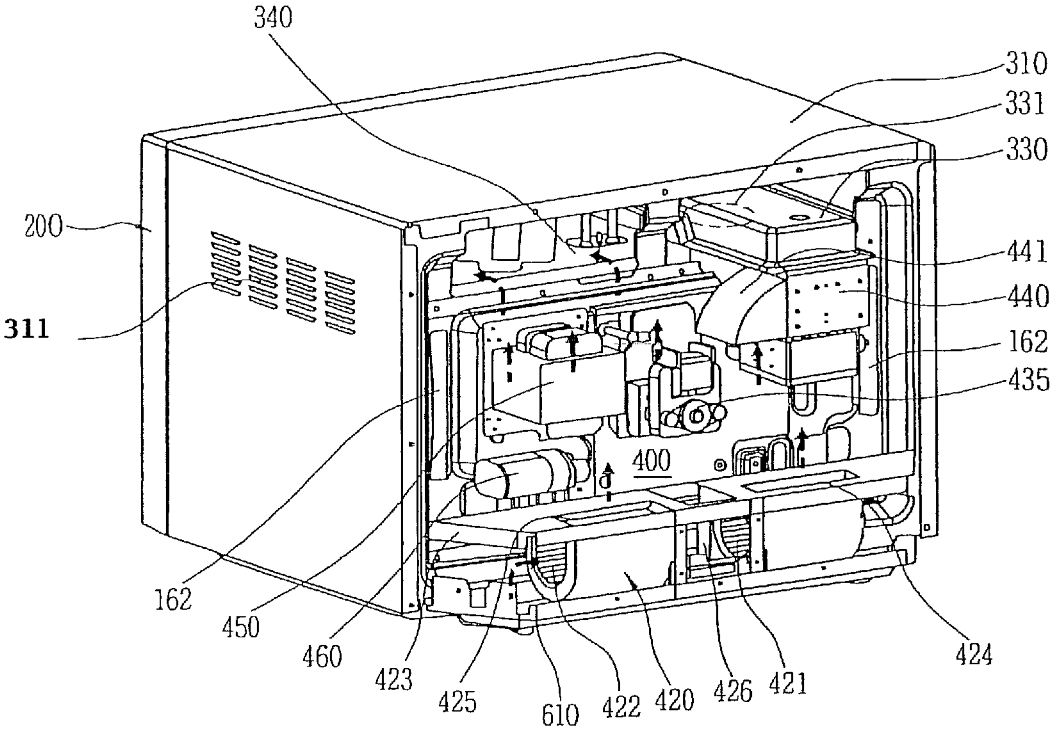
Figure 4:
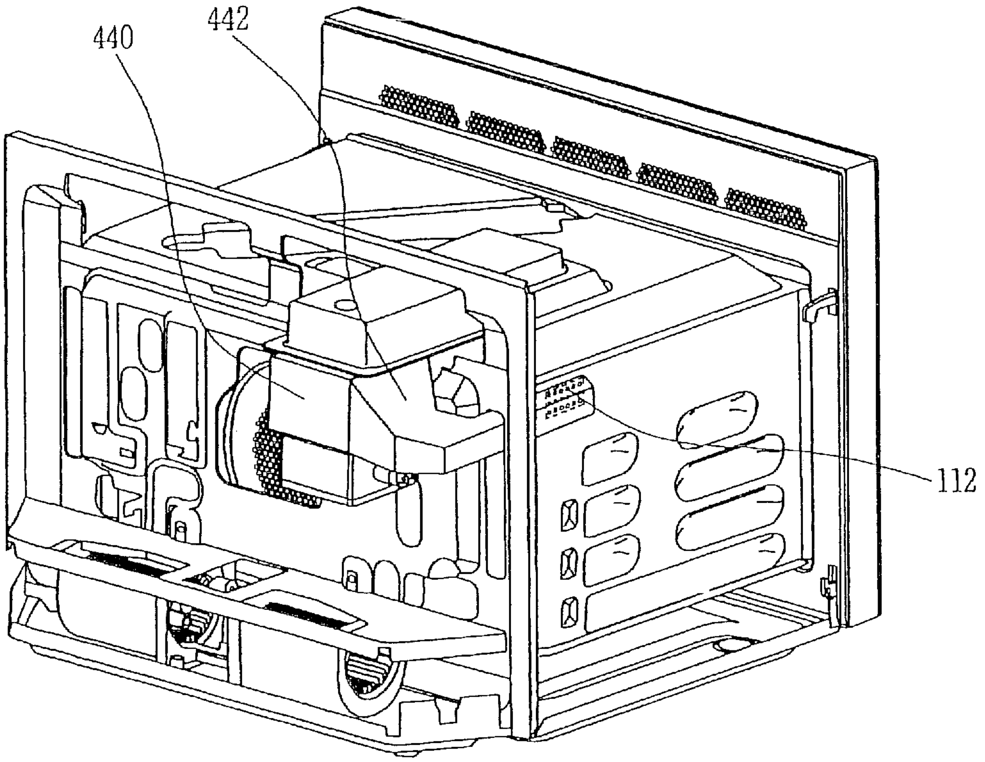
FIG. 4 is a schematic view of an upper space, rear space and lateral side space of the exemplary cooking apparatus shown in FIG. 1, in accordance with embodiments as broadly described herein.

FIGS. 3 and 4 are views of rear spaces of a cooking apparatus in accordance with embodiments as broadly described herein. In addition to the structure shown in FIG. 2, the rear space 400 may also include a flow guide 441 (shown in FIG. 3) for guiding air flow to the magnetron 440, and a flow guide 442 (shown in FIG. 4) for guiding the air flow coming out of the magnetron 440 toward an inlet 112 that is formed on a lateral face of the cooking cavity 100. This structure makes it possible to guide the air flow generated from the cooling fan 420 into the cooling cavity 100 stably and efficiently, and to effectively cool the core components of the cooking apparatus, and in particular, the magnetron 440.

The convection heater assembly 430 may include a fan 431, a heater 432, an inner heater cover 433, an outer heater cover 434, and a motor 435. A heat insulating material (not shown) may be placed between the inner heater cover 433 and the outer heater cover 434. Adequate space may be provided in the rear space 400, and, in particular, adequate depth, to accommodate the motor 435 and its rearward protrusion into the rear space 400. By structuring the cooking apparatus as shown, for example, in FIGS. 1-4, the larger volume of the rear space 400 can accommodate the major components used in the operation of the cooking apparatus, such as, for example, the heater assembly 430, the magnetron 440, the transformer 450, the capacitor 460, and the like, and the cooking cavity 100 can be expanded in the lateral and vertical directions. Also, by using a plate 130 instead of a turntable, full use may be made of the height, width and depth of the cooking cavity 100.

Additionally, by positioning the cooling fan 420 at the lower portion of the rear space 400, the rear space 400 may be more fully utilized, while still cooling the magnetron 440, transformer 450, capacitor 460, and other such components.

Also, by positioning the cooling fan 420 at the lower portion of the rear space 400 and providing for communication between the rear space 400, the upper space 300, the door 200, the cooling cavity 100, and the lateral spaces 500, essentially all parts of the cooking apparatus can be effectively cooled by the cooling fan 420. Further, as the cooling fan 420 is installed along the width direction of the rear space 400, the heating elements such as, for example, the convection heater assembly 430, the magnetron 440, the high voltage transformer 450, and the high voltage capacitor 460, which are provided in the rear space 400, can be cooled effectively. Further, flow can be communicated to the upper space 300, the lateral spaces 500 and the cooking cavity 100 and be vented through an outlet 611 formed on the base at the lower portion of the cooking cavity 100. The partition wall 423 and the openings 424 and 425 form a flow path that directs cooling air flow across the various heating elements, effectively and selectively.

The rear frame 160 may include an opening 162 which enables a direct air flow from the rear space 400 to the lateral space 500 and directs air flow to both sides of the rear space 400, thereby directing cooling air flow onto both sides of the rear space 400.

The magnetron 440, the high voltage transformer 450, and the high voltage capacitor 460 are major components used in the operation of this exemplary cooking apparatus. Each of these components generates a significant amount of heat. Thus, the magnetron 440 may be placed above the opening 424, while the high voltage transformer 450 and the high voltage capacitor 460 may be placed above the opening 425, as shown, for example, in FIGS. 2-4, to provide for adequate cooling of these components. Other arrangements of these heating elements may also be appropriate, based on the positioning of the cooling components. Likewise, the cooling components may be rearranged based on the positioning of the heating components that require cooling.

The lateral spaces 500 are spaces on both sides of the cooking cavity 100 defined by the lateral sides of the cooking cavity 100 and the outer case 310. The lateral spaces 500 are in communication with the upper space 300, the rear space 400, and the lower space 600, and also with the cooking cavity 100, through the inlet 112 and the outlet 111. The flow generated from the cooling fan 420 travels from the rear space 400, the upper space 300, the cooking cavity 100, the lateral spaces 500, and eventually to the lower space 600. The flow traveling through the upper space 300 and heading to the lateral spaces 500 can guide flow as it exits the cooking cavity 100 through the outlet 111 to the lower space 600.

The lower space 600 is a space below the cooking cavity 100 defined by a bottom of the cooking cavity 100 and the base 610. The base 610 may be connected to the front frame 150 and the rear frame 160 to support the cooking apparatus, and includes the outlet 611 for discharge of flow originated at the cooling fan 420, as well as odors and heat generated in the cooking cavity 100. Although the rear side of the lower space 600 may be partially defined by the rear frame 160, the base 610 is connected to the cover 410 over the rear frame 160. Therefore, the base 610 also defines a portion (the lower portion) of the rear space 400. The outlet 611 may be in a number of different positions, including to the side of the outlet 111, or at the center of the base 610, as necessary to define a sufficiently long flow path. Since hot air flow is vented through the outlet 611, the cooking apparatus should not be placed on a kitchen appliance that is sensitive to heat. To protect such a kitchen appliance from any damages due to overheated air, a plate 612 (see FIG. 5) may be connected to the base 610 at a distance so that heat may be exhausted in lateral directions.

Figure 5:
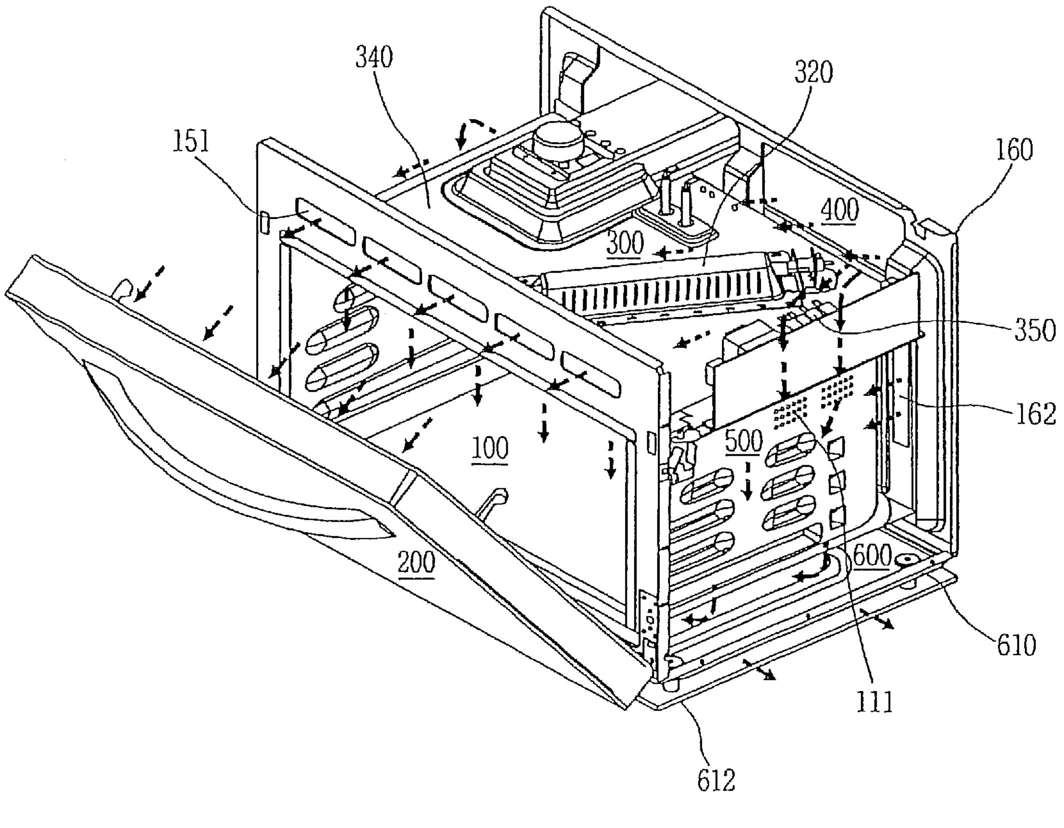
FIGS. 5 and 6 illustrate a cooling flow path through the exemplary cooking apparatus shown in FIG. 1, in accordance with embodiments as broadly described herein.
Figure 6:
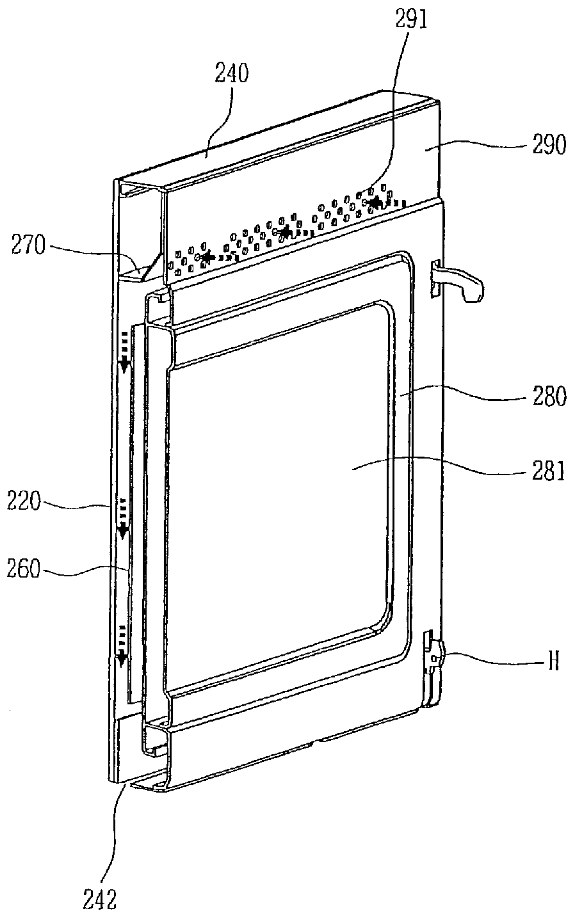

FIGS. 5 and 6 are schematic views of a cooling flow path in accordance with embodiments of the cooking apparatus as broadly described herein. Flow is generated in the rear space 400 and travels up into the upper space 300. One part of the flow in the upper space 300 is directed down into the lateral spaces 500 formed on opposite sides of the cooking cavity 100. Another part of the flow in the upper space 300 flows out through the opening 151 and turns towards the door 200. Still another part of the flow in the rear space 400 may turn towards the lateral spaces 500 through the opening 162 formed in the rear frame 160. The flow in the upper space 300 cools the heater 320 and the relay substrate 350. In certain embodiments, the relay substrate 350 is positioned on the insulating upper plate 340 so as to minimize any disruption or hindrance to the flow of cooling air through the upper space 300. The flow passing through the lateral spaces 500 turns towards the lower space 600, and is vented through the outlet 611 formed, in certain embodiments, at the center of the base 610.

Although there is no particular restriction as to the location of the outlet 611, it is preferably located around the center of the base 610, as this allows for a sufficient amount of heat exchange as the flow travels or circulates inside the cooking apparatus as long as possible. To protect a bottom surface on which the cooking apparatus is placed, the protective plate 612 may be connected to the base 610 at a certain distance apart from the base 610, so that the flow may be exhausted in lateral directions. In addition, flow passing through the lateral spaces 500 guides the flow vented through the outlet 111 of the cooking cavity 100 to the lower space 600.

The air flow that comes through the opening 291 of the choke cover 290 travels between the front plate 220 and the middle plate 260. As the air flow enters the space between the front plate 220 and the middle plate 260, the air flow impinges on a surface of the bracket 270, which, in certain embodiments, is inclined so as to guide the flow down towards an outlet 242 formed in the bottom surface of the door panel 240, where it is exhausted to the outside. In alternative embodiments, the flow may also, or instead, be exhausted through the openings through which the hinges H protrude.

As shown in FIG. 1, the input sensor 230 and the control panel 250 may be positioned at opposite upper side portions of the door panel 240. Thus, the bracket 270 installed as shown in FIG. 6 blocks the flow of air into the input sensor 230 and the control panel 250 to protect these components from heat and air flow. Additionally, one side of the middle plate 260 blocks the transfer of heat through the air flow, and the other side of the middle plate 260 blocks the transfer of heat through a stagnant air layer. As a result, heat generated in the cooking cavity 100 is blocked, and thus not transferred to the outside of the door 200 or to the handle 210.

Figure 7:
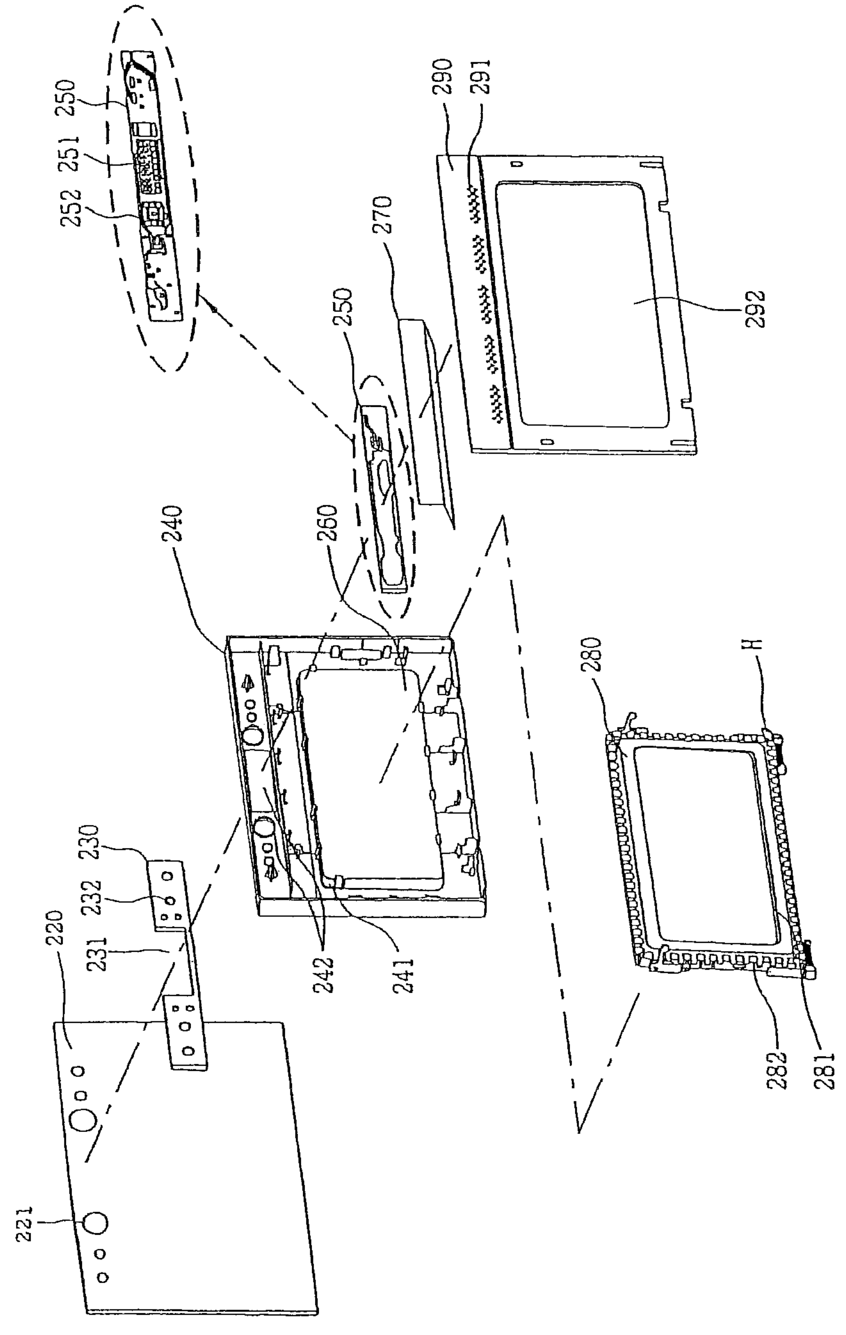
FIGS. 7 through 9 are various views of a door of the exemplary cooking apparatus shown in FIG. 1, in accordance with embodiments as broadly described herein.
Figure 8:
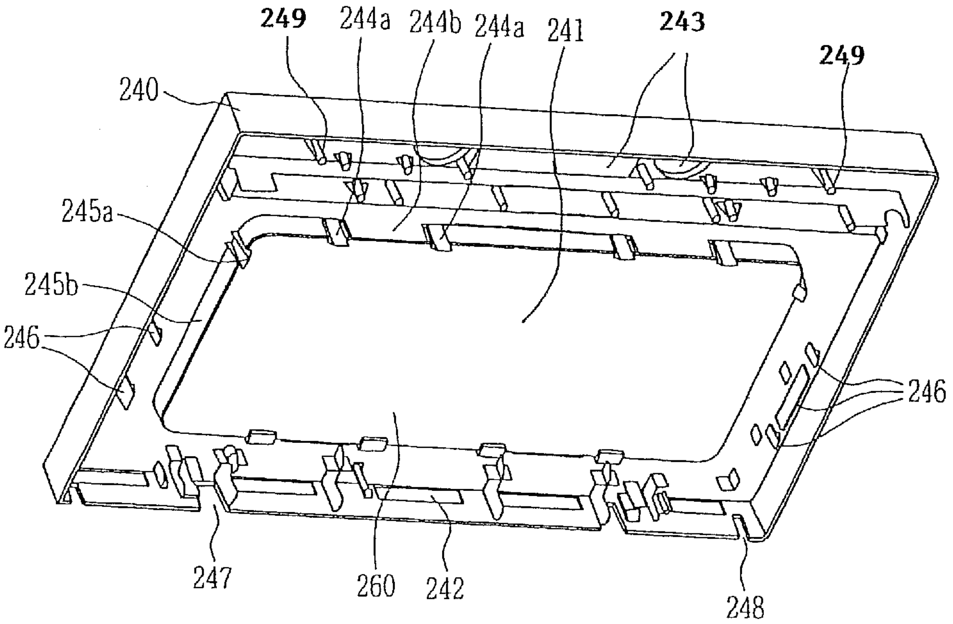
Figure 9:
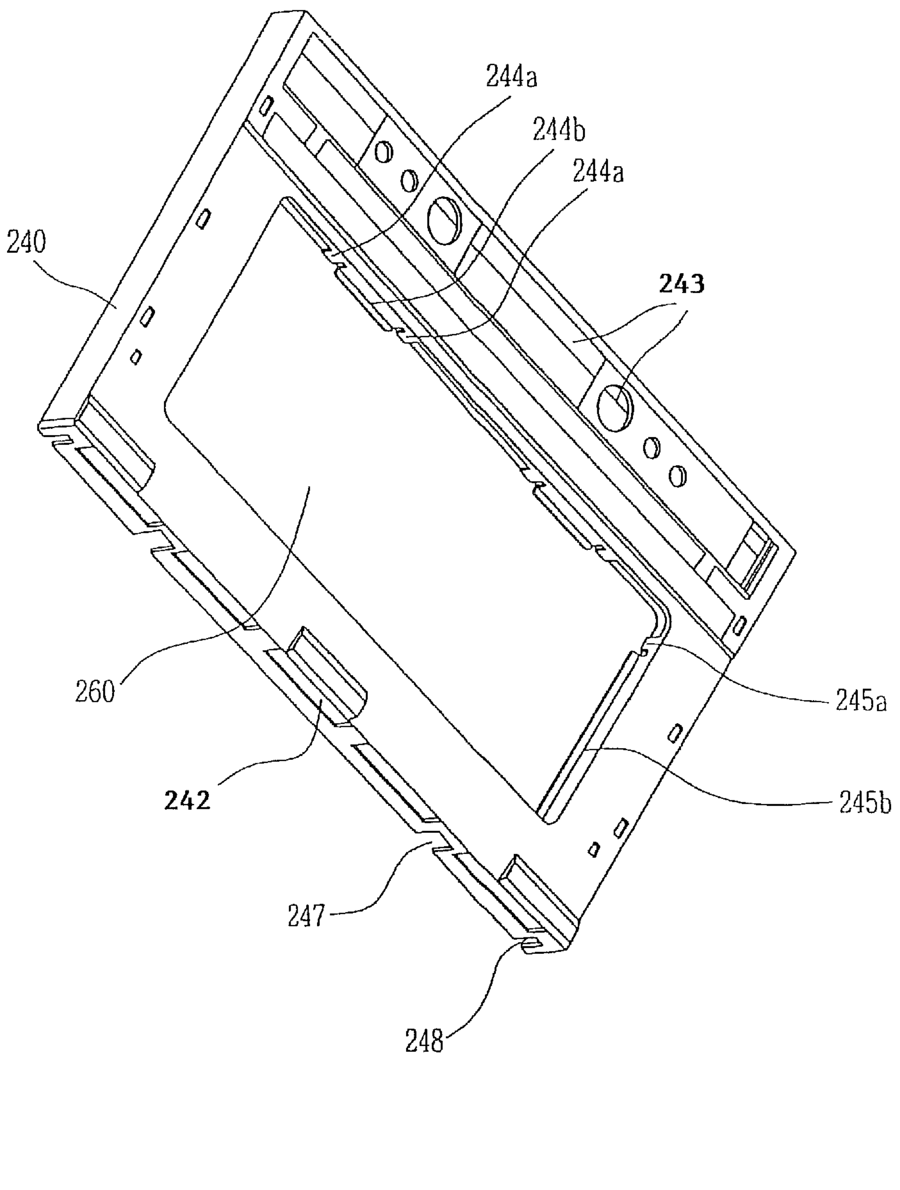

FIGS. 7 through 9 are schematic views of an exemplary door 200 of the cooking apparatus as embodied and broadly described herein. As set forth above, the door 200 may include a front plate 220, an input sensor 230, a door panel 240, a control panel 250, a middle plate 260, a bracket 270, a door frame 280, and a choke cover 290. The front plate 220 may include a display (not shown), such as, for example, a button type display unit or other suitable display. The display and the input sensor 230 together form an operating panel. The door frame 280 may include a door screen 281 and a choke unit 282 to block microwaves, and may be hinged to a side of the cooking cavity 100 by a hinge H, either under the door screen 281, as shown in FIG. 7, or at other locations as appropriate.

In certain embodiments, the front plate 220, the middle plate 260, and the door screen 281 may be made of transparent materials such as, for example, glass or plastic, and the door panel 240 and the choke cover 290 may have openings 241 and 292, respectively, so that an interior of the cooking cavity is visible from the outside.

Light-emitting sources 251 and 252 such as, for example, LEDs and the like, may be provided at the front side of the control panel 250 to illuminate the display unit. If so provided, openings 231, 232 and 242 through which light may pass may be formed at corresponding portions of the input sensor 230 and the door panel 240, respectively.

The choke cover 290 may also have opening(s) 291 through which air flow for cooling the door 200 can travel. By separately forming the portion of the choke covet 290 that includes the opening(s) 291 from the portion of the choke cover 290 that includes the opening 292, assembly of the door 200 can be simplified and improved.

The middle plate 260 may be mounted at the opening 241 of the door panel 240 on the opposite side to which the front plate 220 is mounted. The door frame 280 may be mounted on the door panel 240 at a predetermined distance away from the middle plate 260 at the opposite side to which the front plate 220 is mounted. The choke cover 290 may be mounted on the door frame 240 so as to cover the choke unit 282 of the door frame 280, while the door screen 281 of the door frame 280 is left exposed to the opening 292 of the choke cover 290.

As shown in FIGS. 8 and 9, the door panel 240 may include fixing projections 249 that couple the control panel 250 to rear portions thereof, and a fixing projection (not shown) that couples the bracket 270 relative to the rear portion and lower side of the control panel 250. The middle plate 260 may be installed at the opening 241 of the door panel 240, leaving a predetermined space therebetween.

The opening 241 may be provided with a plurality of assembly hooks **244*a* and 245*a* and support units 244*b* and 245*b* that protrude backward with respect to the assembly hooks 244*a* and 245*a*. In certain embodiments, one support unit 244*b* is provided between a pair of assembly hooks 244*a* on the upper and lower sides of the opening 241 of the door panel 240, and one assembly hook 245*a* and one support unit 245*b* is provided on each of the two opposite sides of the opening 241. For ease of illustration, FIGS. 8 and 9 show one assembly hook 245*a* at each upper side portion, and one support unit 245*b*** proximate the lower corner of each side. Other such arrangements may also be appropriate.

In order for the assembly hooks **244*a* and 245*a* and the support units 244*b* and 245*b* to support the front and rear surfaces of the middle plate 260, in certain embodiments, the space between the assembly hooks 244*a* and 245*a* and the support units 244*b* and 245*b* is approximately equal to a thickness of the middle plate 260. The assembly hooks 244*a* and 245*a* and the support units 244*a* and 245*b* may be partially formed on the circumference of the opening 241 of the door panel 240 to minimize flow resistance when air flows in and out through the opening 241**.

A wire guide 246 for guiding a wire connected to the control panel 250 may be provided on the door panel 240. In FIG. 8, the wire guide 246 is shown at a rear of the door panel 240. Location and number of wire guides 246 may be adjusted as necessary. An opening 247 for wire-connecting to the cooking cavity side may also be provided in the door panel 240, and an opening 248 which engages with a hinge H depending on the opening/closing of the door 200 may also be provided on the door panel 240. Locations and numbers of the openings 247 and 248 may be adjusted as necessary. Locations and numbers of outlets 242 through which flow is vented may also be adjusted as necessary. In alternative embodiments, air flowing through the door 200 may instead, or also, be exhausted through the openings through which the hinges H protrude.

In accordance a cooking apparatus as embodied and broadly described herein, a height and a width of the cooking cavity can be expanded by locating a component room at a rear of the cooking apparatus. Additionally, by using a rack or a plate instead of a turntable in the cooking cavity, and by utilizing the rear space of the cooking cavity for a component room, a height, width and depth of the cooking cavity may be adjusted.

Further, by positioning such a component room at the rear of the cooking apparatus, the component room has an increased space such that a convection heater can be accommodated and utilized effectively. Additionally, by positioning a cooling fan at a lower portion of the component room and by arranging heating elements, such as, for example, a magnetron, a high voltage transformer, and a high voltage capacitor in such a component room appropriately, these heating elements may be cooled more effectively by positioning them along a cooling flow path generated by the cooling fan.

In a cooking apparatus as embodied and broadly described herein, a control panel provided on the door can be protected from heat generated in the cooking cavity, the control panel being provided at an upper portion of the door corresponding to an upper space of the cooking apparatus formed for the purpose of expanding the cooking cavity in height and width.

Further, the door and handle can be cooled effectively and transfer of heat therethrough blocked using air flow that travels from the upper space of the cooking apparatus and into the door using both an air flow and a stagnant air layer. In certain embodiments, the air flow is generated in a rear space of the cooking apparatus.

A cooking apparatus as embodied and broadly described herein provides an expanded cooking cavity with an increased height and width, and an expanded visual field for the cooking cavity by installing main components in a rear space of the cooking apparatus and by providing the control panel on the door. Additionally, such an arrangement makes a front face of the cooking apparatus appear have a cleaner appearance.

A cooking apparatus as embodied and broadly described herein forms a cooling flow path from a cooling cavity towards a door and is capable of preventing foreign substances from getting inside the door through the cooling air flow path.

A cooking apparatus as embodied and broadly described herein can effectively cool a rear space, an upper space, and a door of the cooking apparatus. In certain embodiments, the rear space of the cooking apparatus can be cooled through a flow traveling from a lower portion to an upper portion of the rear space. Further, heat and smells produced in the cooking cavity can be removed by using a flow of a cooling flow path formed in the rear space. Further, a convection heater assembly can be accommodated behind the cooking cavity, and heating elements such as a magnetron, a high voltage transformer, a high voltage capacitor and the like can be arranged at a rear space, and can be cooled effectively.

A cooking apparatus as embodied and broadly described herein can perform an effective cooling operation by retaining the cooling flow in the cooking apparatus for a sufficient amount of time before the cooling flow comes out of the cooking apparatus, and can protect heat-sensitive flooring of a kitchen from an exhausted flow. Additionally, a flow can travel from a rear space, through an upper space and a lateral space, and to a lower space of the cooking apparatus, and from the rear space directly to the lateral space and a side portion of the rear space, thereby cooling the side portion of the rear space.

In one embodiment, a cooking apparatus has a cooking cavity with an increased height and width by efficiently using the rear space of the cooking apparatus which accommodates a convection heater assembly and heating elements such as a magnetron, a high voltage transformer and a high voltage capacitor and that has a capability of cooling them effectively.

In another embodiment, a cooking apparatus has a cooling fan installed at the lower portion of the rear space of the cooking apparatus, thereby creating a cooling flow path, and which has major components installed on the cooling flow path for cooling.

In another embodiment, a cooking apparatus uses a rack or a plate instead of a turn table and takes advantage of the rear space of the cooking apparatus so that the height, width and depth of the cooking cavity can be adjusted.

In another embodiment, a cooking apparatus includes a cooking cavity, and a component room located at the rear side of the cooking cavity and provided with a plurality of components used for a cooking process in the cooking cavity. Through this structure, the cooking apparatus has an expanded cooking cavity with an increased height and width. The use of a rack or a plate instead of a turntable in the cooking cavity may improve the utility of the cooking cavity.

In one embodiment, the cooking apparatus includes a cooling fan located at the lower side of the component room to cool at least part of the plurality of components. Through this structure, the plurality of components located at the rear side of the cooking cavity can be cooled more effectively.

In another embodiment, the cooking includes a cooling fan located at the lower side of the component room to cool the plurality of the components, the cooling fan being positioned below the plurality of components. The cooling fan may be located along the width direction of the component room to cool the plurality of components. Through this structure, the components located at the rear side of the cooking cavity can be cooled effectively.

In another embodiment, the plurality of components includes a magnetron and the cooking cavity is provided with a port communicating with the magnetron at the upper surface of the cooking cavity. Through this structure, microwaves can be effectively supplied to the cooking apparatus using a plate instead of a turntable and the rear space with limited spare room due to the installation of the plurality of components can be utilized efficiently as well. The plurality of components may also include a convection heater assembly, a magnetron, a high voltage transformer, and a high voltage capacitor. Through this structure, large volume components can be arranged at the rear side of the cooking cavity, resultantly providing the cooking apparatus with an expanded cooking cavity with an increased height and width.

In another embodiment, the cooking apparatus includes a cooling fan located in the component room that generates separate forced flows for cooling at least two of the plurality of components. Through this structure, the components requiring cooling, each being dispersed throughout the component room due to its large volume, can be cooled effectively, efficiently, and selectively. In another embodiment, the plurality of components comprise at least two of a convection heater assembly, a magnetron, a high voltage transformer, and a high voltage capacitor; and the apparatus further comprises a cooling fan located in the component room to cool the plurality of components and generating separate forced flows for cooling at least two of the plurality of components.

In another embodiment, there is provided a cooking apparatus, including a cooking cavity provided with an air flow inlet at a lateral side thereof, a fan located at the rear side of the cooking cavity and generating an air flow, and an air flow guide guiding the air flow generated from the fan to the air flow inlet. Through this structure, air flow can be more effectively guided into the cooking cavity by utilizing the fan located at the rear side of the cooking cavity.

In another embodiment, there is provided a cooking apparatus, including a cooking cavity, a component room located at the rear side of the cooking cavity and having a plurality of components that include a magnetron and at least one of a convection heater assembly, a high voltage transformer, and a high voltage capacitor, a cooling fan located at the lower side of the component room to cool at least part of the plurality of components and generating a flow, and a flow guide guiding the flow to the magnetron. Through this structure, the magnetron can be cooled effectively.

In another embodiment, there is provided a cooking apparatus, including a cooking cavity, and a cooling fan located at the rear of the cooking cavity and along a width direction of the cooking cavity. Through this structure, the components located along the width direction of the cooking cavity can be cooled effectively.

In another embodiment, there is provided a cooking apparatus, including a cooking cavity, an upper space located over the cooking cavity, a rear space located behind the cooking cavity; a door covering the cooking cavity and the upper space, and a cooling fan located at the lower side of the rear space and generating a flow. Through this structure, it is possible to arrange components necessary for a cooking process in the cooking cavity in the upper space and the rear space, and to cool the components effectively.

In another embodiment, there is provided a cooking apparatus, including a cooking cavity, an upper space located over the cooking cavity, a rear space located behind the cooking cavity, a door covering the cooking cavity and the upper space and a control panel located at the region of the door covering the upper space. As the control panel is installed at the door and necessary components are located in the upper space and the rear space, the cooking cavity can be expanded in height and width.

In another embodiment, the cooking apparatus includes a partition wall formed across the rear space, communicating with the rear space over the partition wall, and preventing the flow from traveling from the rear space over the partition wall to the cooling fan. Through this structure, it is possible to form a flow toward the rear space, the upper space and/or the door. One thing to be careful here is that such a partition wall may have a structure capable of blocking at least part of the flow in a reverse direction.

In another embodiment, there is provided a cooking apparatus, including a cooking cavity, an upper space located over the cooking cavity, lateral spaces located on both sides of the cooling cavity, and a rear frame attached to the rear of the cooking cavity and provided with a cooling fan at the lower side thereof and an opening communicating with the upper space.

In another embodiment, there is provided a cooking apparatus, including a cooking cavity, an upper space located over the cooking cavity, lateral spaces located on both sides of the cooking cavity, and a rear frame attached to the rear of the cooking cavity and provided with a cooling fan at the lower side thereof and an opening communicating with the lateral spaces.

In another embodiment, a cooking apparatus is capable of protecting a control panel from heat that is generated in a cooking cavity, the control panel being provided at an upper portion of a door corresponding to an upper portion of the cooking apparatus for the purpose of expanding a cooking cavity in height and width, and effectively guiding cooling air flow that travels inside a door by using air flow traveling from an upper space of the cooking apparatus towards the door.

In another embodiment, there is provided a cooking apparatus, including a cooking cavity generating heat during cooling, a door for opening and closing the cooking cavity and provided with a control panel, and a bracket provided at the door to protect the control panel from the heat of the cooking cavity. Through this structure, the control panel can be incorporated with the door, and be protected from heat that is generated in the cooking cavity.

In alternative embodiments, the control panel is located at an upper portion of the door, and bracket is located at the upper portion of the door from the rear of the control panel and has a shape covering the rear side and lower side of the control panel.

In another embodiment, the cooking apparatus includes a cooling flow path extended from one side of the cooking cavity into the door, along which a flow passes and the bracket is provided onto the cooling flow path inside the door to protect the control panel from the heat and the flow. Although the flow to the control panel is blocked by the bracket, it serves to block heat transfer to the control panel by being continuously supplied to the bracket.

In another embodiment, the cooking apparatus includes a cooling flow path extended from one side of the cooking cavity to the door, along which a flow passes, and wherein the bracket is located on the cooling flow path for the flow to pass by one lateral side of the middle plate. Through this structure, one side of the middle plate can block heat by the flow, while the other side of the middle plate can block heat through a stagnant air layer.

In another embodiment, a cooking apparatus looks larger than its real size in height and width by installing main components such as a magnetron, a high voltage transformer and a high voltage capacitor at the rear space of the cooking apparatus and by forming the front surface of the door as one component.

In another embodiment, there is provided a cooking apparatus, including a cooking cavity, an upper space located over the cooking cavity, a door covering the cooking cavity and the upper space, opening the cooking cavity from the upper space side and provide with a door pane; an operating panel installed at an upper portion of the door to be positioned to the upper space, the operating panel being located in front of the door panel, and a control panel installed at an upper portion of the door to be positioned to the upper space, the control panel being located at the door panel and rear the operating panel and cooperating with the operating panel. Through this structure, it is possible to expand the cooking cavity in height and width, combine the operating panel and the control panel with the door as one body, and cover the entire front surface of the door by a member, thereby upgrading the outward appearance of the cooking apparatus. Here, the operating panel is preferably provided with an input sensing unit such as a glass touch unit, but other types of operating panels, for example, an operating panel that receives a user input mechanically and converts it into an electric signal, may also be used.

In another embodiment a cooking apparatus includes a cooling flow path from a cooking cavity towards a door, and is capable of preventing foreign substances from getting inside the door through the cooling flow path.

In another embodiment, there is provided a cooking apparatus that includes a cooking cavity and a door opening and closing the cooking cavity and including a front plate, a door frame located at the rear of the front plate to block microwaves and a middle plate located between the front plate and the door frame to block heat transferred from the cooking cavity to the front plate.

In another embodiment as broadly described herein, there is provided a cooking apparatus, coincluding a cooking cavity carrying out a cooking process using microwaves, a door opening and closing the cooking cavity and provided with a door frame blocking the microwaves, a flow path extended from the cooking cavity side to the door side for a flow to pass thereon, and a choke cover formed at the door and provided with a first opening communicating with the flow path of the cooling cavity side and preventing foreign substances from getting into the door, and a second opening formed to expose the door frame.

In another embodiment as broadly described herein, there is provided a cooking apparatus, including a cooking cavity carrying out a cooking process using microwaves, a door opening and closing the cooking cavity and provided with a door frame to block the microwaves, a flow path extended from the cooking cavity side to the door side for a flow to pass thereon, a door panel mounting the door frame and provided with an opening formed for the flow to pass therethrough, a middle plate located on the opening and blocking heat generated from the cooking cavity, and a choke cover formed at the door and provided with a first opening communicating with the flow path of the cooking cavity side, and a second opening formed to expose the door frame; wherein the middle plate, the door frame, and the choke cover are mounted on the door panel for the flow to form a flow path of the door side passing from the first opening of the choke cover, via the upper portion of the door frame, through at least one of the lateral surfaces of the middle plate.

In another embodiment, a cooking apparatus is provided that is capable of getting rid of heat and smells produced in a cooking cavity, by using a flow of cooling flow path formed in a rear space of the cooking apparatus.

In another embodiment, there is provided a cooking apparatus, including a cooking cavity; a rear space located behind the cooking cavity, and a cooling flow path located at the rear space and extended from a lower portion for the rear space to an upper portion of the rear space to cool the rear space. Through this configuration, it makes possible to cool the rear space of the cooking apparatus through a flow traveling from the lower portion to the upper portion thereof.

In another embodiment, the cooling flow path is composed of at least two separate sub-paths for cooling at least two heating members that include a convection heater assembly, a magnetron, a high voltage transformer, and a high voltage capacitor in the rear space. Through this configuration, the heating members that need to be cooled can be arranged in the rear space efficiently in terms of space usage, and can be cooled effectively.

In another embodiment, there is provided a cooking apparatus, including a cooking cavity; an upper space located over the cooling cavity; a rear space located behind the cooking cavity; and a cooling flow path extended from the rear space to the upper space. Through this configuration, the rear and upper spaces of the cooling apparatus can be cooled effectively.

The cooking apparatus also includes a first heating member located at the rear space, and a second heating member located at the upper space and generating more heat than that generated by the first heating member. Through this configuration, the cooking apparatus is capable of effectively performing a cooling operation through the cooling flow path. Examples of the first heating member include a magnetron, a high voltage transformer, a high voltage capacitor and the like, and examples of the second heating member include a halogen heater and the like.

In another embodiment, there is provided a cooking apparatus, including a cooking cavity, a door located in front of the cooking cavity and including a control panel, a rear space located behind the cooking space, and a cooling flow path extended from a lower portion of the rear space to an upper portion of the rear space to cool the rear space.

In another embodiment, there is provided a cooling apparatus, including a cooking cavity, a rear space located behind the cooking cavity, a lower space located under the cooking cavity, a cooling flow path extended from the rear space to the lower space; an inlet of the cooling flow path provided at the rear space, and an outlet of the cooling flow path provided at the lower space. Through this configuration, a flow can sufficiently remain in the cooking apparatus, and thus the cooking apparatus can effectively be cooled down. Also, a cooking apparatus with a cooling flow path from the rear space to the lower space can be provided.

In another embodiment, there is provided a cooking apparatus, including a cooking cavity, a rear space located behind the cooking cavity, an upper space located over the cooking cavity, a lateral space located at least one side of the cooking cavity, a lower space located below the cooking cavity, and a cooling flow path extended from the rear space to the upper space, in which a flow travels through the lateral space out to the lower space. Through this configuration, a cooking apparatus can be provided in which a flow passes through the rear, lateral, upper and lower spaces thereof.

In another embodiment, there is provided a cooking apparatus, including a cooking cavity, a rear space located behind the cooking cavity, an upper space located over the cooking cavity; a cooling fan located at a lower portion of the rear space for generating a flow from the rear space to the upper space, and a lateral space located at least one side of the cooking cavity and having an opening to communicate with the rear space. Through this configuration, a flow can travel from a rear space directly to a lateral space and a flow can travel to a side portion of the rear space, thereby the cooling and flowing in the side portion of the rear space can be smoothly performed.

In another embodiment, there is provided a cooking apparatus, including a cooking cavity, an upper space located over the cooking cavity, a rear space located behind the cooking cavity and having an inlet of a flow, a lower space located below the cooking cavity, and a rear frame installed at a rear surface of the cooking cavity to isolate the rear space from the lower space, and having an opening to communicate the rear space with the upper space.

In another embodiment, there is provided a cooking apparatus, including a cooking cavity, and a cooling flow path passing from a rear surface of the cooking cavity, via an upper surface of the cooking cavity, through a lateral surface of the cooking cavity.

In another embodiment, there is provided a cooking apparatus that is capable of exhausting a flow escaped from a cooking cavity to the outside through a flow with a different flow path, guiding a flow escaped from a cooking cavity to a lower space of the cooking apparatus, and getting rid of heat and smells produced in a cooking cavity, by using a flow formed in a rear space of a cooking cavity.

In another embodiment, there is provided a cooking apparatus, including a cooking cavity provided with a first opening and a second opening, a first flow path extended for a flow to enter into the first opening and come out of the second opening, and a second flow path combining with the flow coming out of the second opening and driving the flow to the outside. Through this structure, it is possible to exhaust a flow escaped from the cooking cavity to the outside of the cooling apparatus through a flow with a different flow path.

In another embodiment, there is provided a cooking apparatus, including a cooking cavity, a rear space located behind the cooling cavity and generating a flow, a first opening and a second opening formed at the cooking cavity, into which the flow enters, and a third opening formed at the cooking cavity, out of which the flow comes. Through this configuration, heat and smells produced in the cooking cavity can be removed by using a flow that is formed in the rear space of the cooking cavity.

In another embodiment, there is provided a cooking apparatus, including a cooking cavity, a rear space located behind the cooking cavity, an upper space located over the cooking cavity, a lateral space located at one side of the cooking cavity, a lower space located below the cooking cavity, an outlet formed at the one side of the cooking cavity, out of which a flow from the cooking cavity comes, and a cooling flow path extended from the rear space through the upper space to the lateral space, along which a flow generated in the rear space travels, and which guides the flow coming out of the outlet to the lower space.

Any reference in this specification to "one embodiment," "an embodiment," "exemplary embodiment," "certain embodiment," "alternative embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A cooking apparatus, comprising:

a housing;

a cooking cavity positioned within the housing;

a rear space located behind the cooking cavity, wherein an inlet is provided at the rear space;

an upper space located over the cooking cavity;

a lateral space located at at least one lateral side of the cooking cavity;

a lower space located below the cooking cavity so as to be shielded from the rear space, wherein an outlet is provided at the lower space; and a cooling flow path in which cooling air flows from the inlet in an upward direction through the rear space, from the rear space into the upper space, through the upper space and then through the lateral space, and consecutively in a downward direction in a discharge area defined by the lower space, to the outlet.

2. The cooking apparatus of claim 1, further comprising a protective plate positioned under the outlet, wherein the protective plate is configured to guide cooling flow coming out of the outlet in a lateral direction.

3. The cooking apparatus of claim 1, wherein the outlet is positioned at a central portion of the lower space.

4. The cooking apparatus of claim 1, further comprising a cooling fan extending along a lower portion of the rear space.

5. The cooking apparatus of claim 1, further comprising:

an upper space located between a top wall of the housing and a top of the cooking cavity; and a door that is rotatably coupled to an open front face of the housing and an open front face of the cooking cavity, wherein the cooling flow path extends from the rear space through the upper space and to the outlet of the cooling flow path formed in the lower space.

6. The cooking apparatus of claim 5, further comprising a pair of side spaces located between two opposite lateral side walls of the housing and respective opposite lateral sides of the cooking cavity, wherein the cooling flow path extends from both the rear space and the upper space into the pair of side spaces, and from the pair of side spaces to the lower space and the outlet, wherein the outlet is formed in a central portion of a base that extends across an open bottom face of the housing.

7. The cooking apparatus of claim 6, further comprising a pair of passages that provide for direct communication between the rear space and each of the pair of side spaces.

8. The cooking apparatus of claim 1, wherein the cooking apparatus is a microwave oven or a combination microwave/convection oven.

9. The cooking apparatus of claim 1, wherein the housing is defined by an external case having a top wall and a pair of opposite lateral side walls, a rear cover that extends across an open rear face of the external case, and a base that extends across an open bottom face of the external case, and wherein the inlet is provided in the rear cover so as to define an entry into the cooling flow path at the rear space and the outlet is provided at a central portion of the base so as to define an exit from the cooling flow path at the lower space.

10. The cooking apparatus of claim 1, wherein the inlet comprises at least one aperture formed in a rear wall of the housing so as to provide for communication between the rear space and an outside of the housing, and the outlet comprises at least one aperture formed in a bottom wall of the housing so as to provide for communication between the lower space and the outside of the housing.

11. A cooking apparatus, comprising:

a housing;

a cooking cavity positioned within the housing;

a rear space located behind the cooking cavity;

an upper space located over the cooking cavity;

a lateral space located at at least one side of the cooking cavity;

a lower space located below the cooking cavity;

a rear frame coupled to a rear surface of the cooking cavity so as to partition the rear space from the lower space, the lateral space and the upper space, wherein the rear frame includes a first opening that provides for communication between the rear space and the upper space, and a second opening that provides for communication between the rear space and the lateral space, and wherein the rear frame shields the rear space from the lower space so as to preclude communication therebetween; and a cooling flow path in which cooling air flows in an upward direction through the rear space, through the upper space and the lateral space, and consecutively in a downward direction in a discharge area defined by the lower space, wherein the cooling flow path extends from the rear space into the upper space through the first opening and extends from the rear space into the lateral space through the second opening.

12. The cooking apparatus of claim 11, further comprising a door that opens and closes the cooking cavity, wherein a cooling flow path of the door is in communication with a portion of the cooling flow path that extends through the upper space.

13. The cooking apparatus of claim 11, wherein the lateral space is formed at two opposite sides of the cooking cavity, and wherein the cooking cavity includes an inlet in communication with the cooling flow path at one of the two opposite sides and an outlet in communication with the lateral space at the other of the two opposite sides, wherein a flow passing through the outlet of the cooking cavity is guided toward an outlet formed in the lower space by a lateral flow in the lateral space.

14. The cooking apparatus of claim 11, further comprising a flow guide positioned along the cooling flow path so as to connect the rear space to an inlet into the cooking cavity.

15. The cooking apparatus of claim 11, wherein the cooling flow path includes a lateral flow path that extends from the rear space to the lateral space.

16. The cooking apparatus of claim 11, wherein a convection heater assembly, a magnetron, a high voltage transformer, a high voltage capacitor, and a relay substrate are positioned along the cooling flow path.

17. The cooking apparatus of claim 11, further comprising a cooling fan extending along a lower portion of the rear space and configured to generate a flow of air that is directed through the rear space to the upper space along the cooling flow path.

18. The cooking apparatus of claim 11, wherein the cooling flow path also extends from the rear space to an interior of the cooking cavity, and from the upper space into an interior of a door that opens and closes the cooking cavity.

19. The cooking apparatus of claim 11, wherein the cooking apparatus is a microwave oven or a combination microwave/convection oven.

20. The cooking apparatus of claim 11, wherein the lower space is defined by a bottom external surface of the cooking cavity and a base that is positioned at a predetermined distance below the bottom external surface of the cooking cavity, and wherein air is exhausted from the cooling flow path through an outlet formed at a central portion of the base.

* * * * *